(12) United States Patent
Lau

(10) Patent No.: US 6,954,012 B2
(45) Date of Patent: Oct. 11, 2005

(54) PERMANENT ELECTRIC MOTOR WITH A SPEED SENSOR

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/321,370

(22) Filed: Dec. 18, 2002

(65) Prior Publication Data

US 2003/0111920 A1 Jun. 19, 2003

(30) Foreign Application Priority Data

Dec. 18, 2001 (GB) .............................................. 0130149

(51) Int. Cl.[7] .............................................. H02K 7/00
(52) U.S. Cl. .................................................. 310/68 B
(58) Field of Search .......................... 310/95, 19, 71, 310/154.01, 68 B, 89, DIG. 6, 273, 272, 177, 40 MM, 67 R, 239, 261, 685; 324/174

(56) References Cited

U.S. PATENT DOCUMENTS

| 3,967,200 | A | * | 6/1976 | Tetsugu et al. ............. 324/173 |
| 4,049,984 | A | * | 9/1977 | Ishii et al. ..................... 310/42 |
| 4,056,747 | A | * | 11/1977 | Orris et al. .................. 310/155 |
| 4,082,968 | A | * | 4/1978 | Jones ....................... 310/68 B |
| 4,481,436 | A | * | 11/1984 | Renaud et al. ................. 310/71 |
| 4,827,175 | A | * | 5/1989 | Kobayashi ................... 310/268 |
| 4,829,254 | A | * | 5/1989 | Baines ........................ 324/167 |
| 4,933,582 | A | * | 6/1990 | Hata et al. ............. 310/154.14 |
| 5,006,744 | A | * | 4/1991 | Archer et al. .................. 310/89 |
| 5,013,946 | A | * | 5/1991 | Sata ...................... 310/40 MM |
| 5,070,269 | A | * | 12/1991 | Tamaki et al. ............... 310/171 |
| 5,079,468 | A | * | 1/1992 | Sata ............................ 310/168 |
| 5,086,243 | A | * | 2/1992 | Hofmann ................... 310/68 B |
| 5,124,602 | A | * | 6/1992 | Nishimura et al. ....... 310/68 B |
| 5,155,401 | A | * | 10/1992 | Kanaya et al. ................. 310/89 |
| 5,326,235 | A | * | 7/1994 | Bruhn ...................... 417/410.1 |
| 5,517,067 | A | * | 5/1996 | Sata ......................... 310/68 B |
| 5,614,775 | A | * | 3/1997 | Horski et al. ............. 310/68 R |
| 5,640,062 | A | * | 6/1997 | Yockey .................... 310/68 D |
| 5,877,572 | A | * | 3/1999 | Michaels et al. ........... 310/179 |
| 5,932,942 | A | * | 8/1999 | Patyk et al. .................. 310/58 |
| 5,939,807 | A | * | 8/1999 | Patyk et al. .................. 310/89 |
| 6,020,660 | A | * | 2/2000 | Wright ..................... 310/68 R |
| 6,025,665 | A | * | 2/2000 | Poag et al. .................... 310/89 |
| 6,081,056 | A | * | 6/2000 | Takagi et al. ................. 310/89 |
| 6,091,171 | A | * | 7/2000 | Ohishi et al. ............. 310/68 B |
| 6,104,113 | A | * | 8/2000 | Beifus ...................... 310/68 B |
| 6,218,750 | B1 | * | 4/2001 | Nakagawa ................ 310/68 B |
| 6,232,687 | B1 | * | 5/2001 | Hollenbeck et al. ......... 310/88 |
| 6,320,288 | B1 | * | 11/2001 | Suzuki et al. ............. 310/68 B |
| 6,326,716 | B1 | * | 12/2001 | Niimi et al. ................ 310/239 |

(Continued)

FOREIGN PATENT DOCUMENTS

| DE | 19615163 A | 10/1996 |
| EP | 0 259 025 A2 | 3/1988 |
| EP | 0 307 709 A1 | 3/1989 |
| EP | 0626748 A1 | 11/1994 |
| EP | 0 915 555 A1 | 5/1999 |
| FR | 2 580 439 | 10/1986 |
| JP | 2001128417 A | 6/1990 |
| JP | 07298555 A | 3/1994 |
| JP | 10313565 A | 11/1997 |
| JP | 11346459 A | 12/1999 |
| JP | 2001343206 A | 5/2000 |

*Primary Examiner*—Darren Schuberg
*Assistant Examiner*—Heba Elkassabgi
(74) *Attorney, Agent, or Firm*—Birch, Stewart, Kolasch & Birch, LLP

(57) ABSTRACT

A PMDC motor with a speed sensor has a cup-like deep drawn rear housing. The speed sensor is located at the bottom of the housing and has an annular base plate supporting a coil with a steel pin core. The coil is connected to two terminals of a connector mounted on the base plate. The connector is aligned with a window in the rear housing.

12 Claims, 1 Drawing Sheet

U.S. PATENT DOCUMENTS

| | | | |
|---|---|---|---|
| 6,333,576 B1 * | 12/2001 | Ishikawa et al. | 310/85 |
| 6,417,587 B1 * | 7/2002 | Komatsu et al. | 310/68 B |
| 6,424,061 B1 * | 7/2002 | Fukuda et al. | 310/49 R |
| 6,462,443 B2 * | 10/2002 | Horng | 310/68 B |
| 6,703,731 B2 * | 3/2004 | Lee | 310/68 B |
| 6,861,775 B2 * | 3/2005 | Lau | 310/71 |
| 2002/0167238 A1 * | 11/2002 | Kogure et al. | 310/89 |

* cited by examiner

PERMANENT ELECTRIC MOTOR WITH A SPEED SENSOR

CROSS-REFERENCE TO RELATED APPLICATIONS

This non-provisional application claims priority under 35 U.S.C. § 119(a) Patent Application No. 0130149.8 filed in Great Britain on Dec. 18, 2001.

BACKGROUND OF THE INVENTION

This invention relates to electric motors and in particular, to a PMDC motor with a speed sensor.

Known speed sensors for PMDC motors use a coil to pick up electromagnetic signals emitted by the motor as the rotor turns. Known arrangements generally mount the sensor coil in the field magnet or in the space between adjacent magnets, resulting in a complex structure or assembly.

The present invention provides a PMDC motor with a speed sensor in which the coil is conveniently located.

BRIEF SUMMARY OF THE INVENTION

Accordingly, the present invention provides a PMDC motor comprising: an armature including a shaft; a housing having an open end and a closed end; an end cap fitted to the open end of the housing and supporting motor terminals and brush gear; at least one permanent magnet fitted inside the housing and forming the stator; a speed sensor having a base plate, a sensor coil fixed to the base plate and sensor terminals connected to the sensor coil for connecting the sensor coil to external lead wires; wherein the speed sensor is located within the housing with the base plate adjacent the closed end of the housing.

Preferably, the base is annular and extends around the shaft.

Preferably, the base plate is contiguous with the closed end and is against the closed end of the housing by the at least one permanent magnet.

Preferably, the base plate has a plurality of axially extending projections which engage the magnet to set the axial location of the magnet with respect to the housing.

Preferably, the sensor further comprises a connector housing the sensor terminals for connecting the sensor to the external lead wires.

Preferably, the housing has a cut away portion aligned with the connector allowing external access to connecter.

Preferably, the coil has a steel core. The steel core may be used to fix the coil to the base.

BRIEF DESCRIPTION OF THE DRAWINGS

One preferred embodiment of the present invention will now be described, by way of example only, with reference to the accompanying drawings, in which.

DETAILED DESCRIPTION OF THE PREFERRED EMBODIMENT

Figure 1:
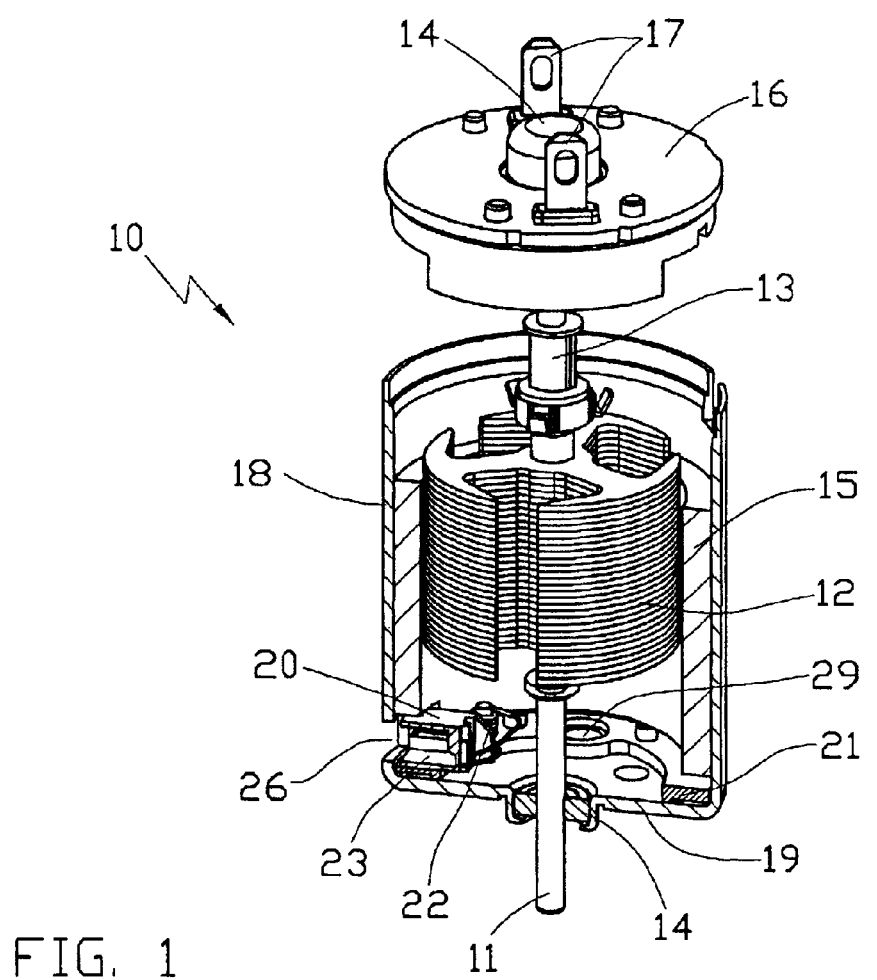
FIG. 1 is an exploded sectional view of a PMDC motor according to the preferred embodiment.

Referring to FIG. 1, there is shown a partial PMDC motor 10. The motor 10 has a housing in the form of a deep drawn rear housing 18 having one closed end forming an end wall 19 and one open end, the open end being closed by an end cap 16 supporting brush gear (not shown) and motor terminals 17. A permanent magnet stator 15 is formed by a ring magnet of the rubber strip type fitted to an inner circumferential surface of the rear housing 18 and confronts, across a small gap, a rotor. The rotor has a shaft 11, a rotor core 12 and a commutator 13. Windings (not shown) are wound about the core and terminated on the commutator 13. The brushes of the end cap 16 engage the commutator 13 to pass electrical power from the motor terminals 17 to the rotor windings to operate the motor. The shaft 11 is journalled in bearings 14 in the end cap 16 and in the rear wall 19 of the rear housing 18. The rear wall 19 also has two drawn holes 29 (only one shown) for mounting the motor to an appliance.

Located against the end wall 19 of the rear housing 18 is a speed sensor 20. The speed sensor comprises a base plate 21 supporting a sensor coil 22 and a connector 23 for the coil. The connector 23 is accessible externally of the motor 10 by a window 26 in the rear housing 18. A corresponding cut-out may be formed in the stator 15, if required. This would depend on the design of the motor and the size of the connector.

Figure 2:
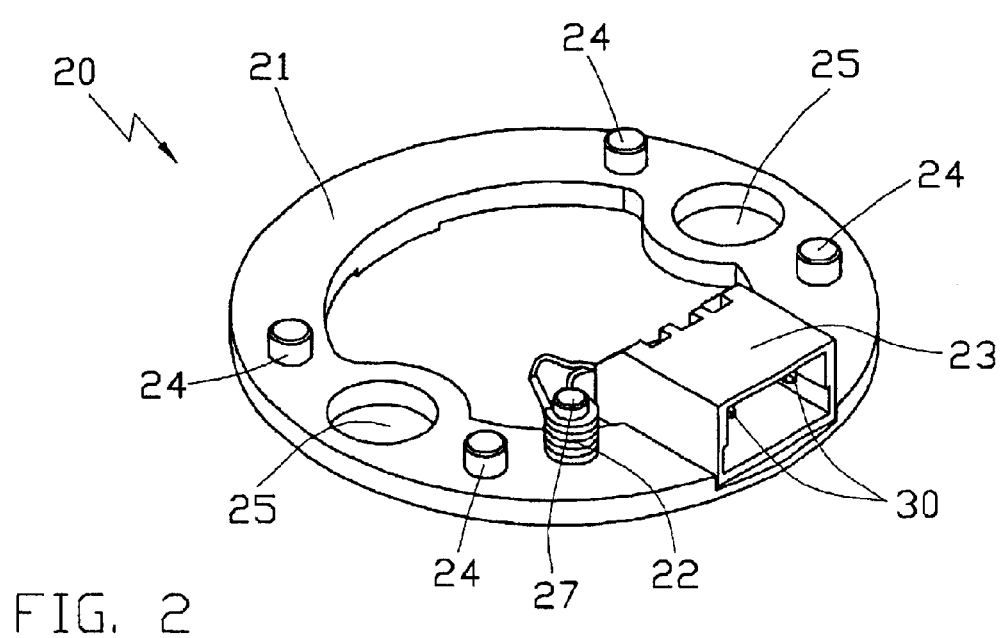
FIG. 2 is an isometric view of a sensor forming a part of the motor of FIG. 1.

The sensor 20 is more clearly shown in FIG. 2. The base plate 21 has an annular configuration. There are four posts 24 which act as seats for the stator magnet 15, limiting and thus setting the axial position of the magnet in the housing. The stator magnet thus holds the base plate 21 to the end wall 19. There are two holes 25 which are arranged to engage the outer surface of the drawn mounting holes 29 in the end wall 19 of the housing to circumferentially locate the base plate 21 and align the connector 23 with the window 26 in the housing. The connector 23, as previously mentioned, is mounted on the base plate 21 and has two pins for connection to a sensor lead (not shown) connected from outside of the motor. Finally, there is the sensor coil 22 itself. The coil 22 is several turns of an insulated preferably single strand wire about a steel pin core 27. The wire is terminated on sensor terminals or pins 30 of the connector 23. The steel pin core 27 concentrates or amplifies the electromagnetic signals picked up by the coil. It also holds the coil 22 to the base plate 21.

The thus described motor incorporates a speed sensor which is conveniently located, easy to install and provides a good pick up of the electromagnetic emissions from the armature windings.

The embodiment described above is given by way of example only and various modifications will be apparent to persons skilled in the art without departing from the scope of the invention as defined in the appended claims. For example, the coil may be located about a post on the sensor plate and the steel pin may be omitted completely or the coil could be mounted to the connector directly in a manner different to that shown in the drawings of the preferred embodiment without departing from the spirit of the invention. Also, the connector and base plate could be formed integrally as a single molded item.

What is claimed is:

1. A PMDC motor comprising:
   an armature including a shaft;
   a housing having an open end and a closed end;
   an end cap fitted to the open end of the housing and supporting motor terminals;
   at least one permanent magnet fitted inside the housing and forming the stator;
   a speed sensor having a base plate, a sensor coil fixed to the base plate and sensor terminals connected to the sensor coil for connecting the sensor coil; wherein
   the speed sensor is located within the housing with the base plate adjacent the closed end of the housing.

2. The motor of claim 1, wherein the base plate is annular and extends around the shaft.

3. The motor of claim 2, wherein the closed end has at least one drawn aperture and the base plate has a corresponding aperture in which the drawn aperture is received for aligning the speed sensor with respect to the housing.

4. The motor of claim 3, wherein the connector is separate from the base plate and rigidly fixed thereto.

5. The motor of claim 3, wherein the connector is integrally molded to the base plate.

6. The motor of claim 1, wherein the coil has a steel core.

7. The motor of claim 6, wherein the coil is fixed to the base plate by the steel core.

8. The motor of claim 1, wherein the sensor further comprises a connector housing the sensor terminals for connecting the sensor.

9. The motor of claim 8, wherein the housing has a cut away portion aligned with the connector allowing external access to the connector.

10. A PMDC motor comprising:

an armature including a shaft;

a housing having an open end and a closed end;

an end cap fitted to the open end of the housing and supporting motor terminals:

at least one permanent magnet fitted inside the housing and forming the stator;

a speed sensor having a base plate, a sensor coil fixed to the base plate and sensor terminals connected to the sensor coil for connecting the sensor coil;

wherein the speed sensor is located within the housing with the base plate adjacent the closed end of the housing, and wherein the base plate is contiguous with the closed end and is pressed against the closed end of the housing by the at least one permanent magnet.

11. The motor of claim 10, wherein the base plate has a plurality of axially extending projections which engage the magnet to set the axial location of the magnet with respect to the housing.

12. The motor of claim 11, wherein the permanent magnet is a ring magnet formed from a rubber magnet strip.

* * * * *